Figure 1:
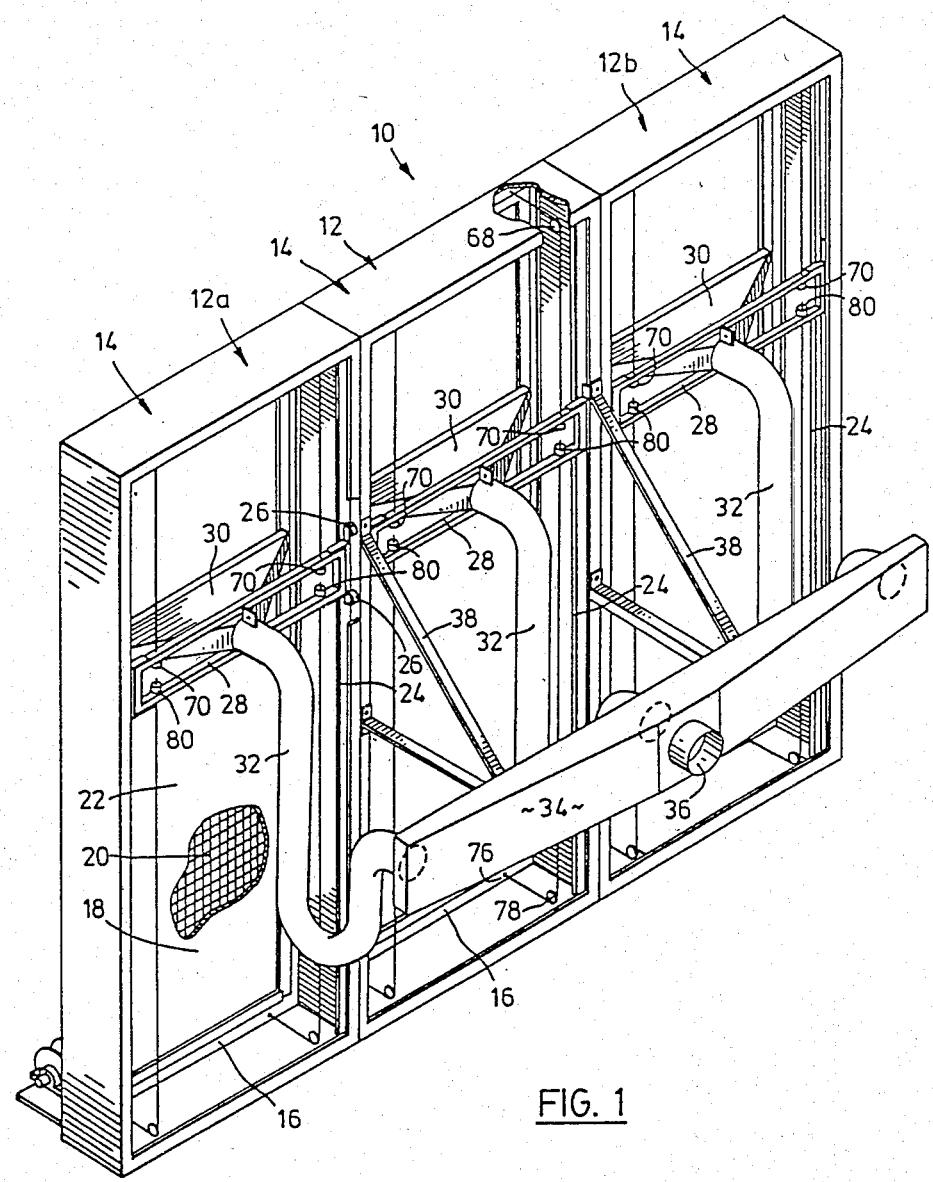

United States Patent [19]

Jones

[11] Patent Number: 4,509,961

[45] Date of Patent: Apr. 9, 1985

[54] AIR FILTER ASSEMBLY

[75] Inventor: William H. Jones, Toronto, Canada

[73] Assignee: Armstrong Jones Inc., Toronto, Canada

[21] Appl. No.: 505,381

[22] Filed: Jun. 17, 1983

[51] Int. Cl.³ .............................................. B01D 35/16
[52] U.S. Cl. .................. 55/294; 55/DIG. 31
[58] Field of Search ............... 55/294, DIG. 31, 284; 210/407

[56] References Cited

U.S. PATENT DOCUMENTS

| | | | |
|---|---|---|---|
| 2,729,304 | 1/1956 | Swanson | 55/294 |
| 3,303,635 | 2/1967 | Sherrill | 55/294 X |
| 3,423,905 | 1/1969 | Chambers | 55/294 |
| 3,555,785 | 1/1971 | Woolridge et al. | 55/294 X |

Primary Examiner—Charles Hart
Attorney, Agent, or Firm—Fetherstonhaugh & Co.

[57] ABSTRACT

In known air filter assemblies, a mechanism provided for vacuum cleaning of the filter has been located entirely on the upstream side of the filter. In the present filter assembly the vacuum head is mounted on a carriage which is located on the upstream side of the frame which supports the filter and a major portion of the drive mechanism which drives the carriage relative to the filter frame is located on the downstream side of the filter frame. This arrangement serves to reduce the likelihood of contamination of the drive mechanism.

1 Claim, 2 Drawing Figures

AIR FILTER ASSEMBLY

FIELD OF INVENTION

This invention relates to air filter assemblies.

In particular, this invention relates to an air filter assembly adapted to permit the air filter elements to be cleaned in situ.

PRIOR ART

Air filter assemblies in which the air filter is vacuumed on the upstream side are known. In the known units, the vacuum mechanism is located on the upstream side of the filter within the contaminated atmosphere. Considerable difficulty has been experienced in maintaining these units because the airborne particles of the contaminated air tend to clog the operating mechanisms.

The present invention overcomes the difficulties of the prior art by mounting the major portion of the power train of the power transmission system on the downstream side and extending drive cables through the wall of the frame to the upstream side at which point they are connected to a carriage upon which the vacuum head is mounted for movement in response to movement of the carriage. By mounting the power source and the major components of the power transmission equipment on the downstream side, it is located out of the contaminated air and is much less susceptible to contamination and more readily accessible for servicing.

In addition, the air filter assembly of a preferred embodiment incudes a plurality of modular units which are interconnected so as to be driven from a common power source and connected to a common vacuum source.

SUMMARY OF INVENTION

According to one aspect of the present invention, an air filter assembly comprising a frame defining a perimeter of an air passage, said frame having an upstream side and a downstream side, a carriage mounted on the upstream side of said frame for movement therealong to traverse the filtration passage between first and second ends of the frame, a vacuum head mounted on said carriage for movement therewith, means connecting said vacuum head to a vacuum source, drive means for driving said carriage along said frame comprising a powered winch mounted at the downstream side of said frame, first and second power transmission cables extending from said winch through said first and second ends of said frame, respectively, and being connected to the carriage such that, upon take-up of said first cable, the carriage is driven to said first end of said frame and upon take-up of said second cable, the carriage is driven to said second end of said frame whereby the vacuum head is caused to traverse substantially the entire upstream face of the filter passage to permit in situ cleaning of the upstream side of a filter mounted in said filtration passage in use.

According to a further aspect of the present invention, an air filter assembly comprises a plurality of frames each defining a perimeter of an air filtration passage, each frame having an upstream side and a downstream side, a plurality of carriages, one carriage being mounted on the upstream side of each frame for movement therealong to traverse the filtration passage between first and second ends of the frame, a plurality of vacuum heads mounted one on each carriage for movement therewith, said frames being arranged side-by-side to form filter modules each supporting a filter element in its air filtration passage, a first of said frames being adapted to support a vacuum manifold at the upstream side thereof and means connecting said vacuum manifold to each of said vacuum heads, a powered drive unit mounted on said first frame at the downstream side of said first frame, winch means mounted at the downstream side of each of said frames, said powered drive means being releasably connected to the winch means of each frame, first and second power transmission cables extending from each winch through the first and second ends of its associated frame, respectively, and being connected to the carriage which is mounted on said associated frame such that, upon take-up of said first cable, its associated carriage is driven to said first end of its associated frame and upon take-up of the second cable, the carriage is driven to the second end of the associated frame to cause the carriage and vacuum head to traverse substantially the entire upstream end of its associated filter passage.

Figure 2:
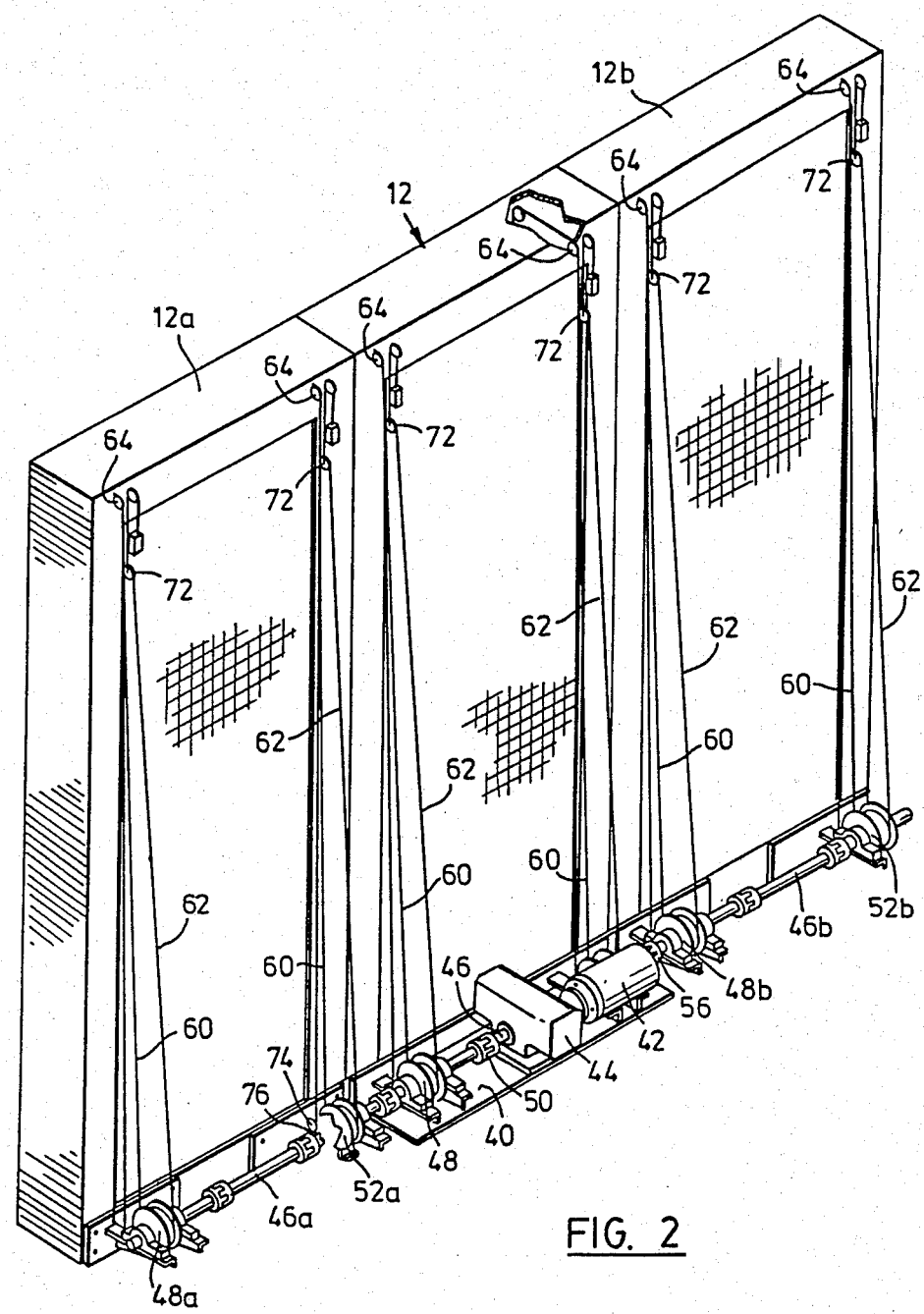

The invention will be more clearly understood after reference to the following detailed specification read in conjunction with the drawings wherein FIG. 1 is a pictorial view of the upstream side of a filter assembly constructed in accordance with an embodiment of the present invention; and FIG. 2 is a pictorial view of the downstream side of an air filter assembly constructed in accordance with a further embodiment of the present invention.

With reference to FIG. 1 of the drawings, reference numeral 10 refers generally to a filter assembly constructed in accordance with an embodiment of the present invention. The assembly illustrated in FIG. 1 consists of modular filter assemblies 12, 12a and 12b. Each module comprises a frame 14 which has a peripheral flange 16 which defines a filter passage 18 in which a screen 20 and filter 22 are removably mounted. The frame 14 has guide rails 24 extending longitudinally at opposite sides thereof and the wheels 26 of a carriage 28 are mounted for rotation in the guide track formed by the rails 24 so that the carriage 28 may traverse the frame. A vacuum head 30 is mounted in the frame 28 with its vacuum intake passage opening toward the upstream side of the filter 22. The vacuum head 30 is connected by means of a flexible conduit 32 to a manifold 34. The manifold 34 is connected to a vacuum source through an outlet 36. The manifold 34 is mounted on the module 12 by support brackets 38.

As shown in FIG. 2, a platform 40 is mounted at the lower end of the module 12 on the downstream side thereof. A motor 42 is mounted on the platform 40 and drivingly connected to a reduction gearbox 44. The reduction gearbox 44 has an output shaft 46 extending from one end thereof and a further output shaft (not shown) extending from the opposite end thereof. The drive shaft 46 is connected to a winch 48 through a coupling 50. Similarly, the other output shaft of the reduction gear 44 is connected to a winch 52 such that the winches 48 and 52 are rotatably driven at the same speed. The winch 48 is connected to a winch 52a of the module 12a which is, in turn, connected to a winch 48a of the module 12a by means of a drive shaft 46a. Similarly, the winch 52 is connected to a winch 48b through a coupling 56. The winch 48b is connected to a winch 52b through a drive shaft 46b. Thus, by rotatably driving the motor 42, the winches 48, 48a, 52a and 52b are each rotatably driven at the same speed. The winch 48 and the winch 52 each have a first cable 60 and a second cable 62 wound thereon in opposite directions whereby when the cable 60 is wound onto the winch 48, the cable 62 will pay out and vice versa. The cables 60 extend upwardly from the winch 48 around pulleys 64 and through passages 66 formed in the frame and around pulleys 68 and downwardly to be connected to the carriage 28 at connecting points 70. The cables 62 extend upwardly from the winch 48 around pulleys 72 downwardly and around a further pulley 74, through a passage 76 in the frame and forwardly over a further pulley 78 and, then, upwardly to be connected to the carriage 28 at connecting point 80.

In use, by rotatably driving the motor 42, the winches 48 48a, 48b, 52a, 52b are rotatably driven and the cables 60 and 62 drive the carriages 28 and their associated vacuum heads over the upstream face of the filter thereby permitting the filter to be cleaned in situ.

By reason of the fact that the principal elements of the power transmission units are located on the downwstream side of the filter assembly, they are not exposed to the contamination of the upstream air and, furthermore, they are located in a compartment which is more convenient for servicing.

The modular construction of the filter assembly of the present invention ensures that it is possible to employ the assembly of the present invention in installations of various different sizes merely by adding additional modules. This is an important feature of a filter such as that of the present invention which is commonly used in commercial laundry dryers which are available in a number of different sizes to provide different drying capacity.

These and other advantages of the present invention will be apparent to those skilled in the art.

The embodiments of the invention in which an exclusive property or privilege is claimed are defined as follows:

1. An air filter assembly comprising
 (a) a plurality of frames each defining a perimeter of a rectangular shaped air filtration passage having a minor dimension and a major dimension, each frame having an upstream side and a downstream side,
 (b) a plurality of carriages, one carriage being mounted, independently of the other carriages, on the upstream side of each frame for movement therealong to traverse the filtration passage between first and second ends of the frame,
 (c) a plurality of vacuum heads each having a width equal to the minor dimension of said filtration passage, said heads being mounted one on each carriage and extending across the width of one of said filtration passages for movement with the carriage on which it is mounted,
 (d) said frames being arranged side-by-side to form filter modules each supporting a filter element in its air filtration passage,
 (e) a first of said frames being adapted to suport a stationary vacuum manifold at the upstream side thereof and flexible conduit means connecting said vacuum manifold to each of said vacuum heads,
 (f) a plurality of flexible conduits, one end of each conduit connecting with the stationary vacuum manifold and the other ends being connected one to each vacuum head,
 (g) a powered drive unit mounted on said first frame at the downstream side of said first frame, which means mounted at the downstream side of each of said frames, said powered drive means being releasably connected to the winch means of each frame, first and second power transmission cables extending from each winch through the first and second ends of its associated frame, respectively, and being connected to the carriage which is mounted on said associated frame such that, upon take-up of said first cable, its associated carriage is driven to said first end of its associated frame and upon take-up of the second cable, the carriage is driven to the second end of the associated frame to cause the carriage and vacuum head to traverse substantially the entire upstream end of its associated filter passage.

* * * * *